(12) United States Patent
Hozumi et al.

(10) Patent No.: US 7,286,335 B2
(45) Date of Patent: Oct. 23, 2007

(54) ELECTRIC DOUBLE LAYER CAPACITOR

(75) Inventors: Yoshihiro Hozumi, Yokohama (JP); Katsuji Ikeda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 40 days.

(21) Appl. No.: 11/407,039

(22) Filed: Apr. 20, 2006

(65) Prior Publication Data
US 2006/0187615 A1 Aug. 24, 2006

Related U.S. Application Data

(63) Continuation of application No. PCT/JP2004/015521, filed on Oct. 20, 2004.

(30) Foreign Application Priority Data
Oct. 21, 2003 (JP) .............................. 2003-360126

(51) Int. Cl.
*H01G 9/00* (2006.01)

(52) U.S. Cl. ...................... 361/502; 361/504; 361/508; 361/512; 361/523; 361/528; 29/25.03

(58) Field of Classification Search ........ 361/502–504, 361/508–512, 516–519, 523–534; 29/25.01, 29/25.03; 429/199–201, 322–323
See application file for complete search history.

(56) References Cited

U.S. PATENT DOCUMENTS 5,856,041 A  1/1999  Inoue et al.
6,064,563 A  5/2000  Yamada et al.
6,222,720 B1 *  4/2001  Aoki et al. .............. 361/301.5
6,282,081 B1 *  8/2001  Takabayashi et al. ....... 361/502

(Continued)

FOREIGN PATENT DOCUMENTS

EP  0 769 820 A1  4/1997

(Continued)

OTHER PUBLICATIONS

U.S. Appl. No. 11/407,039, filed Apr. 20, 2006, Hozumi et al.

(Continued)

*Primary Examiner*—Nguyen T. Ha
(74) *Attorney, Agent, or Firm*—Oblon, Spivak, McClelland, Maier & Neustadt, P.C.

(57) ABSTRACT

An electric double layer capacitor capable of preventing leakage of an electrolytic solution from the inside and interfusion of unnecessary material from the outside, and capable of forming insulation between a terminal and an outer casing, is provided.

A lower-insulation ring 131 is fit into a terminal 112 until the lower-insulation ring comes in the upper side of a flange portion 113. Then, the terminal 112 in this state is inserted into a center of the through hole 111a of a sealing plate 111 from the inside of an outer casing 121. Then, an O-ring 133 is press fit into a spacing 135 formed by a cylindrical portion 112a and the through hole 111a. Further, an upper-side insulation ring 137 is fit to the upper side of this press fit O-ring 133. Then, a setting spring 139 is attached to the terminal 112 so as to press down the upper-side insulation ring 137.

14 Claims, 8 Drawing Sheets

U.S. PATENT DOCUMENTS

| | | | |
|---|---|---|---|
| 6,366,447 B1 * | 4/2002 | Nakaaki | 361/518 |
| 6,379,402 B1 | 4/2002 | Suhara | |
| 6,711,000 B2 * | 3/2004 | Takeishi et al. | 361/523 |
| 6,845,003 B2 * | 1/2005 | Oyama et al. | 361/502 |
| 6,896,993 B2 | 5/2005 | Hozumi | |
| 6,911,281 B2 * | 6/2005 | Sonoda et al. | 429/199 |

FOREIGN PATENT DOCUMENTS

| | | |
|---|---|---|
| EP | 852803 A | 7/1998 |
| JP | 09-115500 | 5/1997 |
| JP | 09-129519 | 5/1997 |
| JP | 10-275744 | 10/1998 |
| JP | 2000-306789 | 11/2000 |
| WO | WO 97/16837 | 5/1997 |

OTHER PUBLICATIONS

U.S. Appl. No. 11/440,114, filed May 25, 2006, Hozumi et al.
Microfilm of the specification and drawings annexed to the request of Japaneses Utility Model Application No. 117490/1988 (Laid-open No. 039472/1990), NEC Kansai, Ltd., Mar. 16, 1990, Claims, p. 2, line 5 to page 3, line 2; Figs. 1 to 4 (Family: none).

* cited by examiner

ELECTRIC DOUBLE LAYER CAPACITOR

CROSS REFERENCE TO RELATED APPLICATIONS

This application claims priority under 35 U.S.C. §371 to PCT/JP2004/015521, filed Oct. 20, 2004, and is based upon and claims the benefits of priority from the prior Japanese Patent Application No. 2003-360126, filed on Oct. 21, 2003, both of which are hereby incorporated by reference in their entirety.

TECHNICAL FIELD

The present invention relates to an electric double layer capacitor, in particular, to an electric double layer capacitor capable of preventing leakage of an electrolytic solution from the inside and interfusion of unnecessary materials from the outside, and capable of forming isolation between a terminal portion and the outer casing.

BACKGROUND ART

An electric double layer capacitor has a terminal portion for conducting inputting and outputting of an electric energy between an element assembly in the inside, and the outside. As the terminal portion, a terminal portion 10A of mold type has been known.

FIG. 6 shows a cross sectional view of a terminal portion of mold type.

In FIG. 6, the mold type terminal portion 10A has a sealing plate 11 in which a pair of terminals 12 and 13 are inserted vertically through the sealing plate, and they are molded to constitute a cap 15. Here, the sealing plate 11 is made of an insulative resin, and the terminals 12 and 13 are made of aluminum, and boundary portions 11a of the sealing plate 11 facing the terminals 12 and 13, and boundary portions 12a and 13a respectively of the terminals 12 and 13 facing them are provided with a labyrinth structure. This structure minimizes gaps between the sealing plate 11 and the terminals 12 and 13, formed by a thermal shrinkage difference between the sealing plate 11 and the terminals 12 and 13, due to the difference of their materials.

Further, to lower portions of these terminals 12 and 13, the respective lead wires 18 and 19 are connected to electrically connect the terminals with electrodes of the element assembly in the inside, not shown.

Further, in the cap 15, a notch 16 formed by circumferentially notching the outermost peripheral portion of the upper face side of the sealing plate 11, is provided. Then, in the notch 16, a seal member 17 made of a rubber having substantially the same shape as the notched shape, is fitted and bonded.

Further, in the uppermost end of the outer casing 21, a crimping portion 23 is provided. The crimping portion 23 is configured to be crimped inwardly to fix the upper side of the cap 15 with a seal member 17 sandwiched between them. Further, in the outer casing 21, a concave portion 24 in which the outer casing 21 is recessed inwardly, is formed at the position below the crimping portion 23 by about the thickness of the sealing plate 11, so that the concave portion 24 supports the underside of the cap 15.

In such a construction, since the terminals 12 and 13 are sufficiently distant from each other, and the sealing plate 11 is made of a resin, the terminals 12 and 13 are sufficiently insulated from each other. Further, since the terminals 12 and 13 are sufficiently distant from the outer casing 21, isolation is formed also between them. Accordingly, it is possible to prevent short circuit through a liquid or short circuit to the earth, of the electric double layer capacitor.

Here, as an electrolytic capacitor having substantially the same terminal portion as the terminal portion 10A, Patent Document 1 is known. Patent Document 1 shows a sealing structure effective for sealing a non-aqueous type capacitor element whose inside needs to be highly dehydrated.

However, in e.g. the above-mentioned terminal portion 10A or the terminal portion shown in Patent Document 1, even if a labyrinth structure is provided in the boundaries between the sealing plate 11 and the terminals 12 and 13, due to e.g. a difference in thermal expansion coefficient or thermal shrinkage coefficient between the resin material constituting the sealing plate 11 and the metal material constituting the terminals 12 and 13, it is difficult to completely prevent leakage of electrolytic solution through the gap between the sealing plate 11 and the terminals 12 and 13.

Further, the cap 15 of the terminal portion 10A is fixed to the outer casing 21 by crimping. However, since the outer casing 21 is usually made of aluminum, due to e.g. increase of internal pressure when the cell is used for a long time, crimping force of the crimping portion 23 is reduced, whereby there has been a risk that an electrolytic solution leaks out through the gap between the cap 15 and the outer casing 21. Additionally, there has been a risk that unnecessary materials are interfused from the outside.

For this problem, as a structure for preventing leakage of electrolytic solution through the gap between the sealing plate 11 and the terminals 12 and 13, a terminal portion 10B serving also as a terminal, has been known.

FIG. 7 shows a cross section of the terminal portion 10B serving also as a terminal. Here, elements in common with FIG. 6 are designated by the same reference numerals and explanations for these elements are omitted.

In FIG. 7, the terminal portion 10B serving also as a terminal, has a one-piece type cap 35. The one-piece type cap 35 is constituted by a sealing plate 31 corresponding to the sealing plate 11 of the mold type terminal portion 10A, and a terminal 32 corresponding to the terminal 12 (or terminal 13), formed in one piece, and these constituents are made of a type of metal. Accordingly, differently from the terminal portion 10A of mold type, the sealing plate 31 serves also as a terminal 2. Further, to the one-piece type cap 35, a lead 18 is connected to electrically connect with a terminal of an element assembly in the inside.

Here, in the one-piece type cap 35, besides a notch 16 circumferentially provided in the upper face side, a notch 36 formed by circumferentially notching the outermost peripheral portion of the lower face side of the sealing plate 31, is provided. Further, to the notch 36, an insulation member 37 is attached, and the insulation member 37 is arranged so as to encompass the side portion of the sealing plate 31.

Further, the one-piece type cap 35 has an upper face side fixed by a crimping portion 23 of the outer casing 21 by crimping, and a lower face side configured to be supported by a convex portion 24 with an insulation member 37 interposed between them. Here, the insulation member 37 is configured to be interposed also between the side portion of the sealing plate 31 of the one-piece type cap 35 and the outer casing 21.

In such a construction, since the sealing plate 31 and the terminal 32 are formed into one-piece member, leakage of an electrolytic solution or interfusion of unnecessary material through a gap between the sealing plate 31 and the terminal 32, can be prevented.

However, in such a terminal portion 10B, it is not possible to maintain the insulation distance between the sealing plate 31 and the outer casing 21, and there has been a risk that short circuit through a liquid or short circuit to the earth is occurred by a dew condensation formed on the one-piece type cap 35 or the outer casing 21.

Patent Document 1: JP-A-10-275744

DISCLOSURE OF THE INVENTION

Problem to be Solved by the Invention

The present invention has been made considering the above-mentioned conventional problems, and it is an object of the present invention to provide an electric double layer capacitor capable of preventing leakage of an electrolytic solution from the inside and interfusion of unnecessary materials from the outside, and capable of forming insulation between terminals and the outer casing.

Means for Solving the Problems

For this object, the present invention provides an electric double layer capacitor comprising an electrolytic solution; an element assembly comprising a positive electrode and a negative electrode which are electrodes each forming an electric double layer at the interface with the electrolytic solution, and a separator interposed between the positive electrode and the negative electrode; an outer casing for accommodating the element assembly; a sealing plate sealing the outer casing; and a terminal portion attached to a through hole perforating the sealing plate and conducting input and output of an electric energy between the element assembly accommodated in the outer casing and the outside;

wherein the terminal portion is constituted by a terminal; fixing means; a first insulation member and a second insulation member which are each encompassing the outer face of the terminal; and a sealing member;

the terminal is inserted into the through hole and electrically connected with one of the electrodes and has a flange portion formed at a portion below the sealing plate, and has a concave portion formed in a portion of the outer face of the terminal above the sealing plate;

the first insulation member is provided between the flange portion and the sealing plate;

the second insulation member is provided in the upper side of the sealing plate;

the sealing member is provided in a spacing defined by the inner face of the through hole, the outer face of the terminal, the first insulation member and the second insulation member;

and the fixing means has one end engaged in the concave portion and another end pushing the second insulation member against the sealing plate.

Since a ring-shaped sealing member is provided in a spacing between the inner face of the through hole and the outer face of the terminal, airtightness between the terminal and the sealing plate is maintained. Further, since the sealing member and insulation members are interposed between the terminal and the sealing plate, the terminal and the sealing plate are sufficiently insulated from each other. Further, by the fixing means, the terminal, the first insulation member, the second insulation member and the ring-shaped sealing member are fixed to the sealing plate, whereby deterioration of airtightness between the terminal and the sealing plate due to jounce of the terminal is prevented.

By such a construction, since airtightness between the terminal and the sealing plate can be maintained, leakage of an electrolytic solution through the gap between them can be prevented. Further, interfusion of unnecessary materials from the outside can also be prevented. Further, since the terminal and the sealing plate are sufficiently insulated from each other, short circuit through a liquid or short circuit to the earth caused by dew-condensation can be prevented.

Accordingly, troubles of electric double layer capacitor can be prevented.

Here, the sealing plate may be integrally formed with the outer casing.

Further, it is preferred that the sealing plate has a bent portion formed by bending the end portion around the through hole, and the sealing member is provided in a spacing defined by the bent portion, the outer face of the terminal, the first insulation member and the second insulation member.

In the sealing plate, a bent portion in which an end portion around a through hole is bent, is formed. Accordingly, a ring-shaped sealing member can be provided in a spacing between the bent portion and the outer face of the terminal, and airtightness between the terminal and the sealing plate can be maintained.

Accordingly, even if the plate thickness of the sealing plate is thin, it is possible to prevent leakage of an electrolytic solution from the inside or interfusion of unnecessary materials from the outside and it is possible to sufficiently provide insulation between the terminal and the sealing plate by the insulation members.

Thus it is possible to appropriately select the structure of the terminal portion according to the plate thickness of the portion to which e.g. the terminal is fixed, and it is possible to fix a terminal to a portion having any plate thickness.

Further, it is preferred that the filling rate of the sealing member in the spacing is at least 0.9.

By this construction it is possible to prevent leakage of an electrolytic solution.

Further, in the present invention, it is preferred that the fixing means is a setting spring, a shaft-retaining ring or a nut.

The terminal portion has a simple component shape as compared with a conventional terminal portion.

For this reason, manufacturing and assembly are easy and production is possible with low cost.

Further, since the terminal portion has a simple component shape, design of the terminal portion becomes more flexible and the terminal portion can be applied to all types of capacitor structures.

Effects of the Invention

As described above, according to the present invention, a ring-shaped sealing member is provided in a spacing between an inner face of a through hole perforating a sealing plate and an outer face of a terminal, and a sealing member and insulation members are interposed between the terminal and the sealing plate, whereby it is possible to maintain airtightness between the terminal and the sealing plate and to prevent leakage of an electrolytic solution through a gap between these members. Further, it is also possible to prevent interfusion of unnecessary materials from the outside. Further, since the terminal and the sealing plate are sufficiently insulated, it is possible to prevent short circuit through a liquid or short circuit to the earth due to dew condensation can be prevented. Accordingly, troubles of an electric double layer capacitor can be prevented.

Further, by use of fixing means, it is possible to press the terminal and a second insulation member against the upper side and to press a first insulation member against the lower side. As a result, it is possible to sufficiently maintain airtightness between the terminal and the sealing plate. For this reason, the sealing structure of the present invention can be suitably used as a sealing structure for a non-aqueous type electrolytic solution type electric double layer capacitor in which a moisture in an element or a gas due to decomposition of the electrolytic solution, is generated at a time of applying high voltage.

EXPLANATION OF NUMERALS

Figure 1:
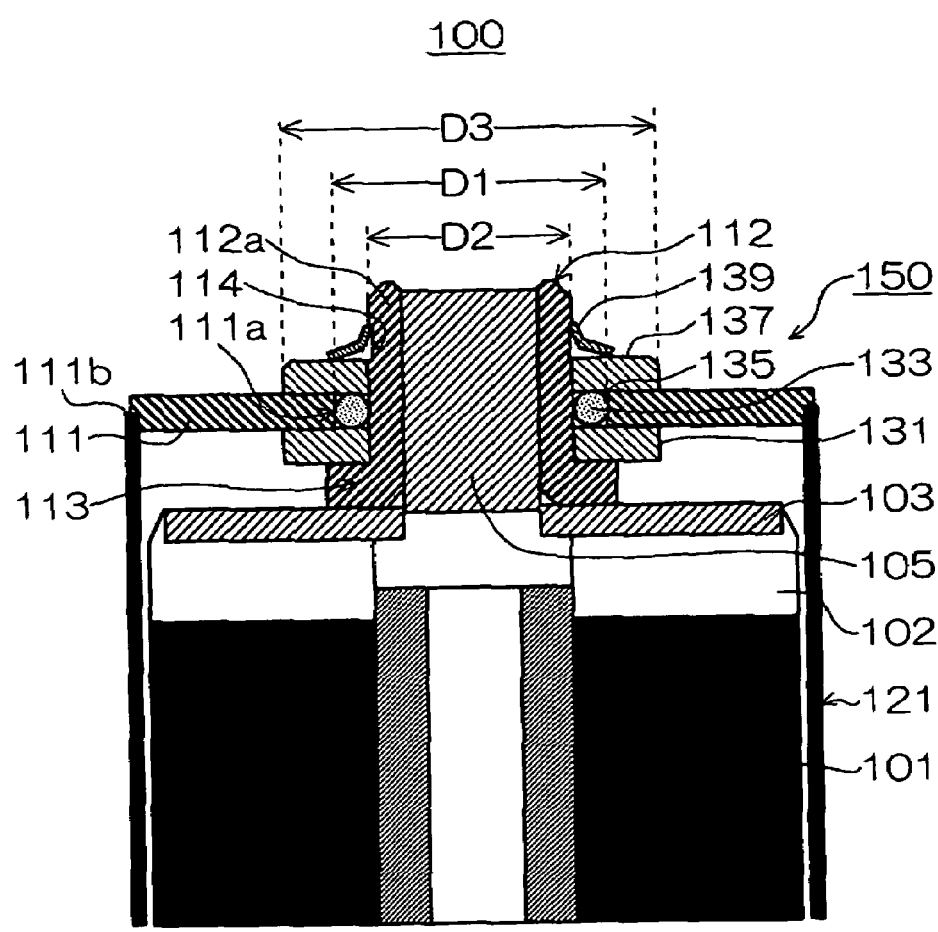
FIG. 1: A cross sectional view of an electric double layer capacitor of a first embodiment of the present invention.

10A, 10B, 150, 250, 260, 350: Terminal portion
11, 31, 111, 311: Sealing plate
12, 13, 32, 112, 212: Terminal
21, 121: Outer casing
100, 200: Electric double layer capacitor
101: Element assembly
102: Lead portion
103: Electric collector plate
105: Electric collection member
111a, 311a: Through hole
112a: Cylindrical portion
113: Flange portion
114: Concave portion
131: Lower-side insulation ring
133: O-ring
135, 355: Spacing
137: Upper-side insulation ring
139: Setting spring
311c: Bent portion
341: Spacer

BEST MODE FOR CARRYING OUT THE INVENTION

From now, the first embodiment of the present invention will be described.

Figure 2:
FIG. 2: An exploded view of the terminal portion of FIG. 1.
Figure 2:
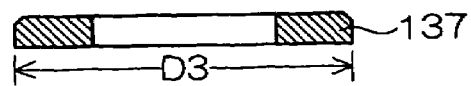
Figure 2:
Figure 2:
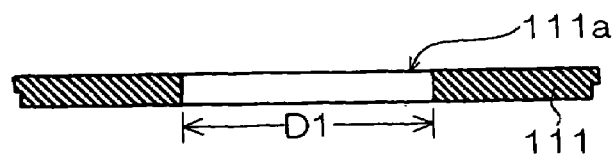
Figure 2:
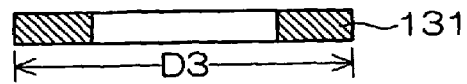
Figure 2:
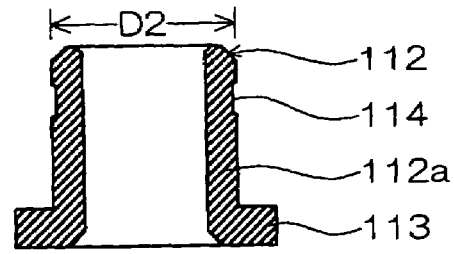
Figure 2:
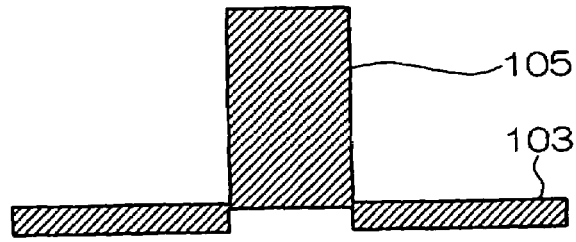
Figure 6:
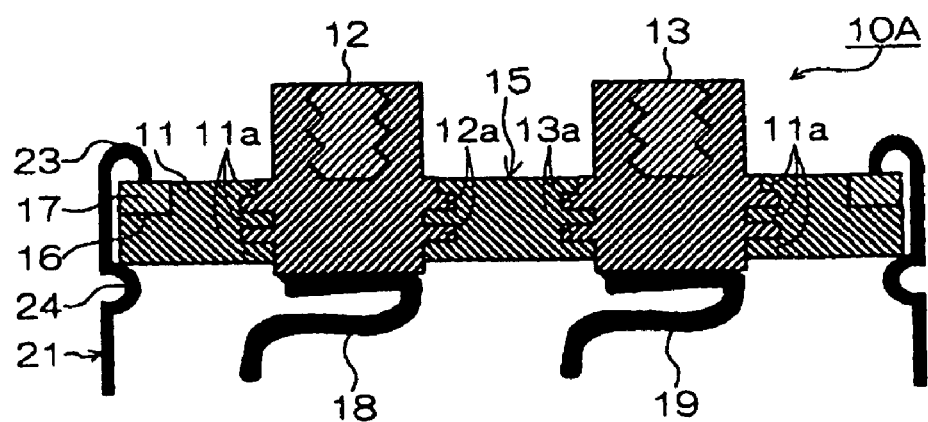
FIG. 6: A cross sectional view of a conventional terminal portion (mold type).
Figure 7:
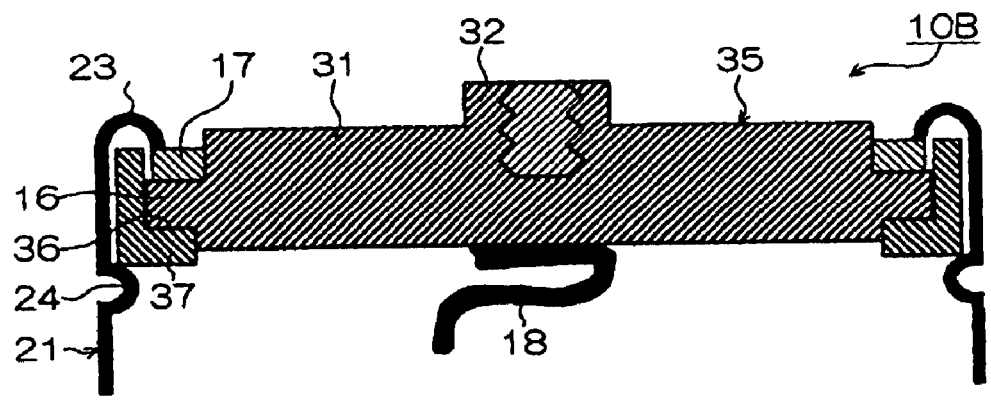
FIG. 7: The same as above (a type serving also as a terminal).

FIG. 1 shows a cross sectional view of an electric double layer capacitor of the first embodiment of the present invention, and FIG. 2 shows an exploded view of the terminal portion of FIG. 1. Here, elements in common with those of FIG. 6 and FIG. 7 are designated by the same reference numerals and their explanations are omitted.

In FIG. 1 and FIG. 2, inside of an outer casing 121 of an electric double layer capacitor 100, an electrolytic solution, not shown, and an element assembly 101 comprising positive and negative electrodes which are electrodes each forming an electric double layer at an interface with the electrolytic solution, and a separator disposed between the positive and the negative electrodes, are accommodated. The element assembly 101 is, for example, a wound type element assembly formed by winding the positive electrode, the negative electrode and the separator. Accordingly, the shape of the outer casing 121 is a cylindrical shape having a closed bottom. Here, the element assembly 101 is not limited to a wound type but may, for example, be a stacked type. In the case of stacked type, the shape of the outer casing 121 becomes a prismatic shape.

To an electrode of the element assembly 101, a lead portion 102 which may be integrally formed with the electrode, is provided. Further, an electric collector plate 103 is connected to the lead portion 102. The electric collector plate 103 is joined to an electric collection member 105 of a terminal portion 150 to be described layer, by e.g. welding.

Further, to a sealing plate 111 sealing the outer casing 121, a terminal portion 150 is attached to conduct inputting and outputting of an electric energy between the element assembly 101 present inside, and the outside.

The sealing plate 111 is formed into a disk shape to accommodate to the shape of the outer casing 121. The sealing plate 111 has, for example, a plate thickness of at least 2 mm to allow an O-ring 133 to be press fit into a spacing 135 to be described later. The sealing plate 111 has an outermost peripheral portion 111b configured to be joined to the outer casing 121 by e.g. welding.

Further, in the central portion of the sealing plate 111, a through hole 11a having a diameter of D1 is formed. In the central potion of the through hole 111a, a terminal 112 is inserted from the inside of the outer casing 121.

Here, the terminal 112 is a hollow member having a cylindrical portion 112a having an outer diameter of D2, and the terminal 112 has a height sufficiently longer than the plate thickness of the sealing plate 111. Further, the cylindrical portion 112a of the terminal 112 has an outer diameter of D2 smaller than the diameter D1 of the through hole 111a.

Further, in the lower side of the terminal 112 (namely, the side of the terminal 112 that is inside the outer casing 121 when the terminal 112 is inserted into the through hole 111a), a flange portion 113 having an outer diameter larger than the outer diameter D2 of the cylindrical portion 112a, is formed. In the upper side of the flange portion 113 (namely, in a side closer to the outside of the outer casing 121 when the terminal 112 is inserted into the through hole 111a), a lower-side insulation ring 131 having an approximately the same internal diameter as the outer diameter D2, is fit to the outer periphery of the cylindrical portion 112a.

The lower-side insulation ring 131 is interposed between the lower face of the sealing plate 111 and the flange portion 113, and has an outer diameter D3 larger than the diameter D1 of the through hole 111a. The thickness of the lower-side insulation ring 131 is, for example, approximately the same as the plate thickness of the sealing plate 111. Here, the lower-side insulation ring 131 is not limited to a ring-shaped member but may be a member having any component shape so long as it can encompass the outer periphery of the cylindrical portion 112a and maintain insulation between the terminal 112 and the sealing plate 111.

Further, to the outer periphery of the cylindrical portion of 112a above the position of the lower-side insulation ring 131, an O-ring 133 having approximately the same inner diameter as the outer diameter D2, is fit. Here, the O-ring 133 is configured to be press fit into the spacing 135 between the outer circumference of the cylindrical portion 112a and the inner circumference of the through hole 111a formed by the difference between the outer diameter D2 of the cylindrical portion 112a and the diameter D1 of the through hole 111a of the sealing plate 111.

Here, the O-ring 133 is not limited to the one having an O-shaped cross section but may be one having any cross sectional shape such as a rectangular shape or an X-shape so long as it is a ring-shaped member.

Further, to the outer circumference of the cylindrical portion 112a, an upper-side insulation ring 137 having approximately the same shape as the lower-side insulation ring 131, is fit so as to contact with the upper face of the sealing plate 111. The O-ring 133 is configured to be sandwiched by these upper-side insulation ring 137 and lower-side insulation ring 131 from upper and lower sides.

Further, between the upper-side insulation ring 137 and the outer circumference of the cylindrical portion 112a, a setting spring 139 is fitted.

Here, in the outer circumference in the upper portion of the cylindrical portion 112a, a concave portion 114 is formed so as to allow an end of the setting spring 139 to be engaged with the recess of the concave portion 114 to press the terminal 112 against the upper side. Further, the end of the setting spring 139 is configured to press the lower-side insulation ring 131 against the upper side (the side of the sealing plate 111) via the flange portion 113 of the terminal 112.

On the other hand, the other end of the setting spring 139 is configured to press the upper-side insulation ring 137 against the lower side (the side of the sealing plate 111).

Accordingly, the lower-side insulation ring 131 and the upper-side insulation ring 137 are applied with forces of upper and lower directions respectively that are opposite directions to each other, whereby the lower-side insulation ring 131 and the upper-side insulation ring 137 sandwich the sealing plate 111 and thus the terminal 112 is fixed to the sealing plate 111.

In the inner circumference of the cylindrical portion 112a of the terminal 112, a cylindrical-shaped electric collection member 105 is embedded. The electric collection member 105 is configured to be joined to the above-mentioned electric collector plate 103 so that the terminal 112 and the electrode of the element assembly 101 are electrically connected via the electric collector plate 103.

In this construction, the process of assembling the terminal portion 150 will be described.

At first, to the terminal 112, the lower-side insulation ring 131 is fit until it reaches the upper side of the flange portion 113 of the terminal 112. Then, the terminal 112 in this state is inserted into the center of the through hole 111a of the sealing plate 111 from the inner side of the outer casing 121. Thereafter, the O-ring 133 is press fit into the spacing 135 formed by the cylindrical portion 112a and the through hole 111a. Further, in the upper side of the press-fit O-ring 133, the upper-side insulation ring 137 is fit. Then, the setting spring 139 is attached to the terminal 112 so as to press-down the upper-side insulation ring 137.

Further, in order to electrically connect the terminal 112 and the electrode of the element assembly 101, the electric collection member 105 and the electric collector plate 103 are joined by e.g. an ultrasonic welding, the electric collector plate 103 and the lead portion 102 are welded by a laser welding and accommodated in the outer casing 121, and the cylindrical portion 112a is joined to the electric collection member 105 by e.g. a laser welding.

Finally, the outermost peripheral portion 111b of the sealing plate 111 to which such a terminal 112 is attached, is joined to the outer casing 121 by e.g. welding.

As a result, since the O-ring 133 is press fit into the spacing 135 between the outer circumference of the cylindrical portion 112a and the inner circumference of the through hole 111a, airtightness between the terminal 112 and the sealing plate 111 is maintained. Further, since the sealing plate 111 and the outer casing 121 are joined by e.g. welding, airtightness between these members is also sufficiently maintained.

Further, since the lower-side insulation ring 131 and the upper-side insulation ring 137 are interposed between the terminal 112 and the sealing plate 111, the terminal 112 and the sealing plate 111 are sufficiently insulated.

Further, the terminal 112 is fixed to the sealing plate 111 by fitting the setting spring 139 to the terminal 112, deterioration of the airtightness between the terminal and the sealing plate 111 due to jounce of the terminal 112, is prevented. For this purpose, the outer diameter of the flange portion 113 needs to be larger than the outer diameter D1 of the through hole 111a.

By this process, since airtightness between the terminal 112 and the sealing plate 111 and airtightness between the sealing plate 111 and the outer casing 121, can be maintained, it is possible to prevent leakage of an electrolytic solution through gaps between these members. Further, interfusion of unnecessary materials from the outside can also be prevented. Further, since the terminal 112 and the sealing plate 111 are sufficiently insulated from each other, short circuit through a liquid or short circuit to the earth due to dew condensation can be prevented. Accordingly, troubles of the electric double layer capacitor 100 can be prevented.

Further, as compared with a conventional terminal portion 10A etc., the terminal potion 150 has a simple component shape and it is easily manufactured and assembled, whereby the terminal portion 150 can be manufactured at low cost. Further, since the terminal portion 150 has a simple component shape, the terminal portion 150 can be designed more flexibly to be applied to all types of capacitor constructions.

Here, in this embodiment, explanation has been made on the assumption that the terminal 112 is attached to the sealing plate 111 by means of a setting spring 139. However, the construction is not limited thereto.

For example, the concave portion 114 may be a thread groove, not shown, of continuous spiral shape formed from the upper end portion of the cylindrical portion 112a, and a nut may be screwed in the thread groove and tightened for fixing. Also in this case, the sealing plate 111 is sandwiched by the lower-side insulation ring 131 and the upper-side insulation ring 137, whereby the terminal 112 is fixed to the sealing plate 111.

As another method, using a concave portion 114 formed in the terminal 112, a shaft-retaining ring, not shown, may be used instead of the setting spring 139 to fix the terminal 112.

Further, in this embodiment, the terminal 112 has been explained to be a hollow member having a cylindrical portion 112a. However, the construction does not have to be limited thereto, but it may be such that the terminal 112 and the electric collection member 105 are integrally formed and thus the terminal may be a solid member.

Figure 3:
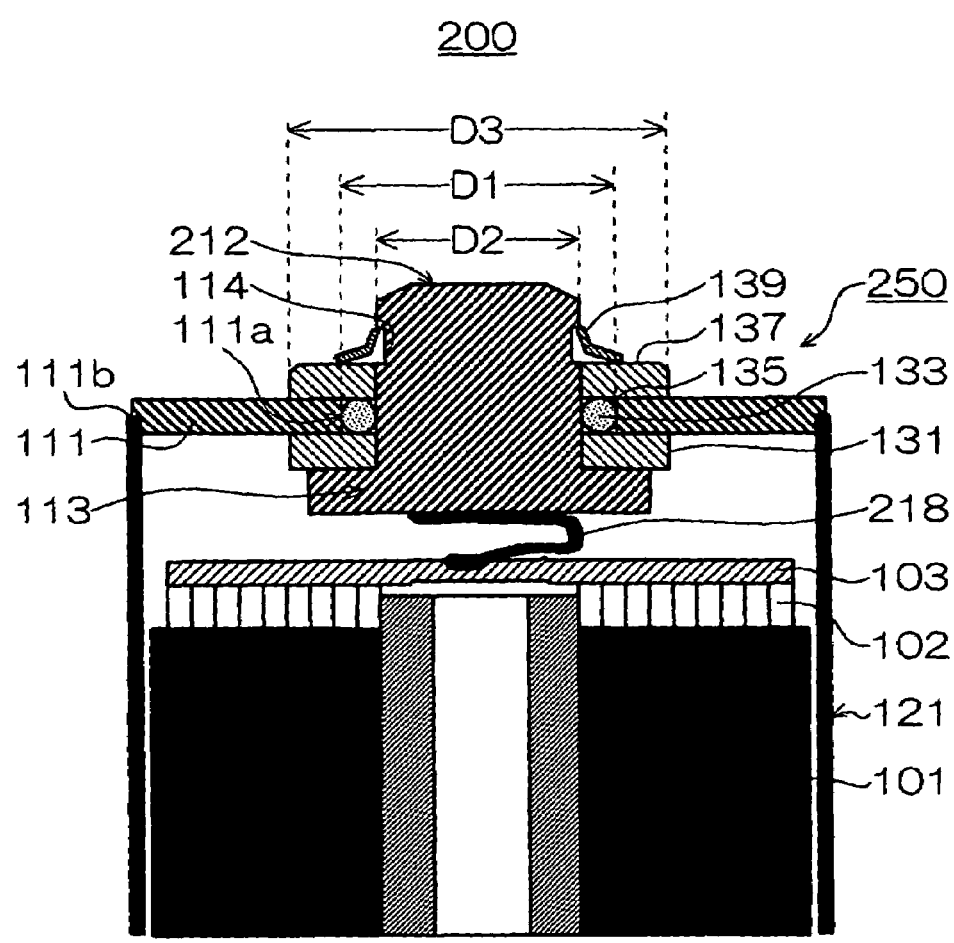
FIG. 3: Another example of an electric double layer capacitor of the first embodiment of the present invention.
Figure 4:
FIG. 4: An exploded view of the terminal portion of FIG. 3.
Figure 4:
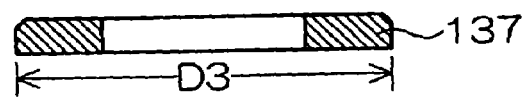
Figure 4:
Figure 4:
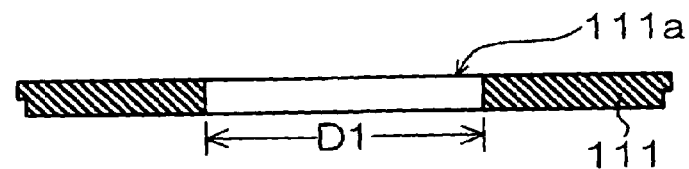
Figure 4:
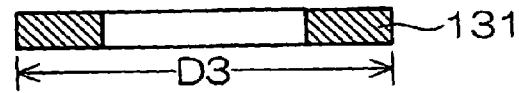
Figure 4:
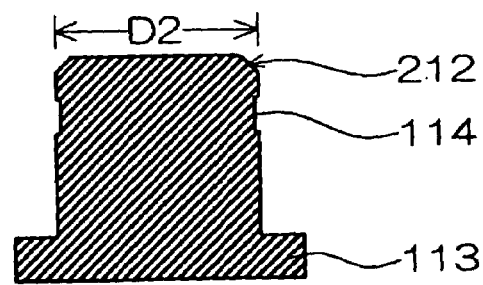
Figure 4:
Figure 8:
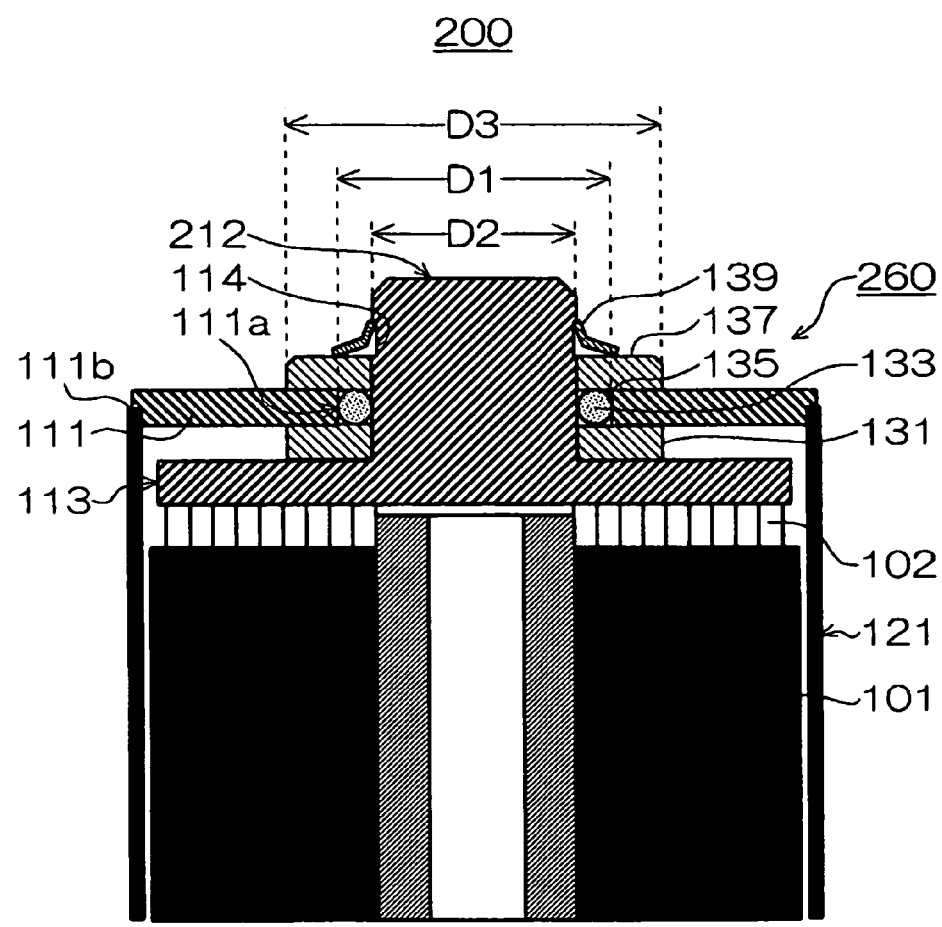
FIG. 8: Another example of an electric double layer capacitor of the first embodiment of the present invention.
Figure 9:
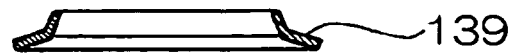
FIG. 9: An exploded view of the terminal portion of FIG. 8.
Figure 9:
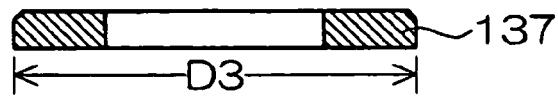
Figure 9:
Figure 9:
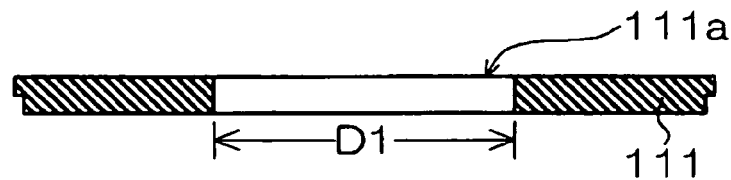
Figure 9:
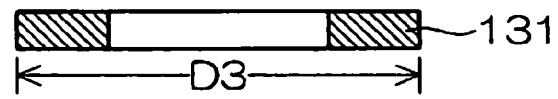
Figure 9:
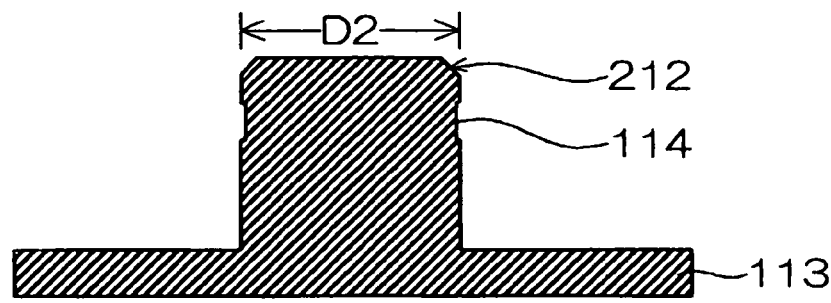

Cross sections of electric double layer capacitors each having such a solid terminal are shown in FIG. 3 and FIG. 8 respectively, and an exploded view of the terminal portion of FIG. 3 is shown in FIG. 4, and an exploded view of the terminal portion of FIG. 8 is shown in FIG. 9. Here, elements in common with those of FIG. 1 and FIG. 2 are designated by the same reference numerals and explanations of these elements are omitted.

In FIG. 3 and FIG. 4, a terminal 212 of a terminal portion 250 of an electric double layer capacitor 200, is a solid member. To the terminal 212, instead of an embedded electric collection member 105, a lead 218 is connected so that the terminal 212 is electrically connected with an electrode in an element assembly 101 in the inside.

In such a construction, since the terminal 212 is solid, electrical connection between the element assembly 101 in the inside and the terminal 212 is previously conducted in the process of assembling the terminal portion 250. Except for this difference, the same functions and effects as those of the terminal portion 150 shown in FIG. 1 and FIG. 2 can be obtained.

Accordingly, the structure of the terminal portion that is easily designed, can be appropriately selected.

Further, also in FIG. 8 and FIG. 9, a terminal 212 of a terminal portion 260 of an electric double layer capacitor 200, is a solid member. A flange portion 113 of the terminal 212 is directly electrically connected with an electric collector plate 103 by e.g. welding. Such a construction is preferred since the number of components can be reduced. Here, the flange portion 113 and the electric collector plate 103 may be previously integrally formed for use as shown in FIG. 8 and FIG. 9.

Then, a second embodiment of the present invention will be described.

Since the electric double layer capacitor 100 of the first embodiment has a construction that an O-ring 133 is press-fit into a spacing 135 between the outer circumference of a cylindrical portion 112a and an inner circumference of a through hole 111a, the plate thickness of the sealing plate 111 is preferably at least 2 mm. However, an electric double layer capacitor of the second embodiment has a construction suitable for a case where the plate thickness of the sealing plate is less than 2 mm.

Figure 5:
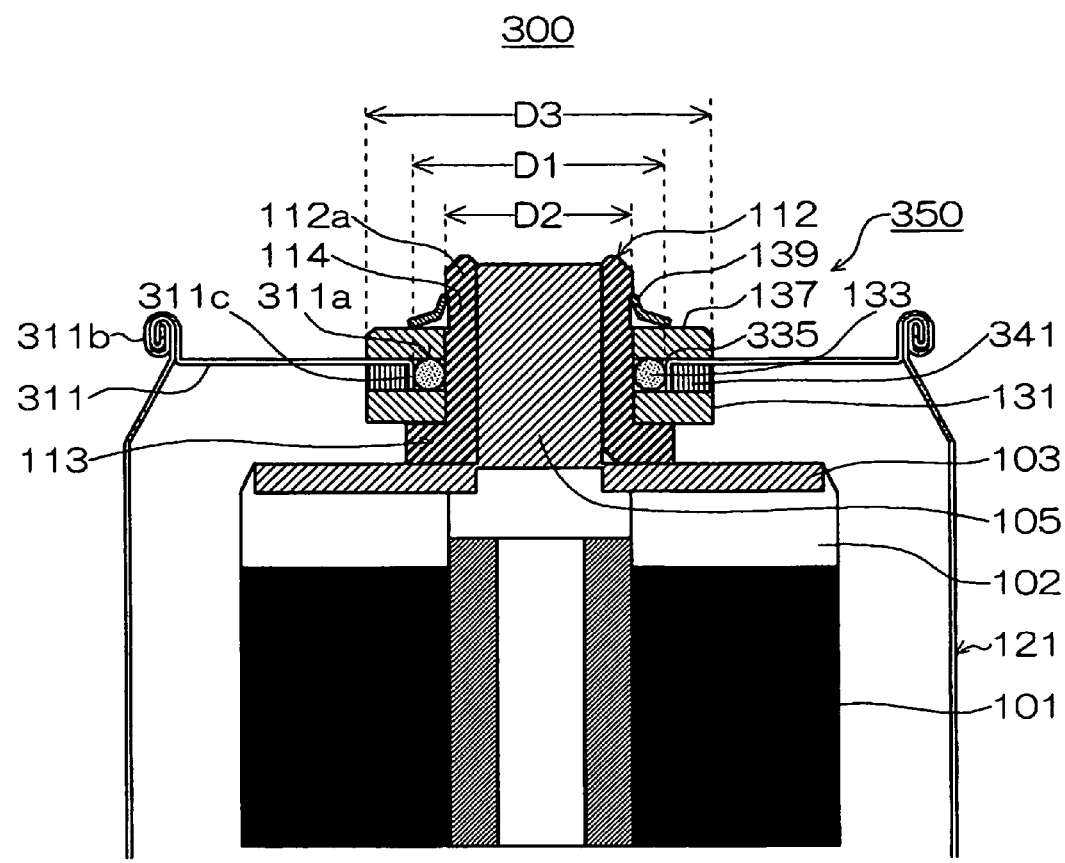
FIG. 5: A cross sectional view of an electric double layer capacitor of a second embodiment of the present invention.

FIG. 5 shows a cross sectional view of the electric double layer capacitor of the second embodiment of the present invention. Here, elements in common with those of FIG. 1 are designated as the same reference numerals and explanations of these elements are omitted.

In FIG. 5, a terminal portion 350 is attached to a sealing plate 311 having a plate thickness (less than 2 mm) thinner than that of the sealing plate 111 of the first embodiment. In the central portion of the sealing plate 311, a through hole 311a having a diameter of D1 is formed in the same manner as the sealing plate 111 of the first embodiment.

Here, in the through hole 311a, a bent portion 311c in which the sealing plate 311 around the through hole is bent downwardly, is formed so that an inner circumference of the through hole 311a is formed by the bent portion 311c. The bent portion 311c corresponds to the plate thickness of the sealing plate 111 of the first embodiment, and the bent width of the bent portion 311c coincides with the outer diameter of the cross section of the O-ring 133.

Further, in the central portion of the through hole 311a, a terminal 112 is inserted from the inside of the outer casing 121 in the same manner as the first embodiment. To the terminal 112, a lower-side insulation ring 131, the O-ring 133, an upper-side insulation ring 137 and a setting spring 139 are fitted in this order. Here, the O-ring 133 is press fit into a spacing 335 defined by the outer circumference of a cylindrical portion 112a of the terminal 112 and the bent portion 311c.

To the through hole 311a, in order to prevent the excessive bent of the bent portion 311c, a spacer 341 is attached so as to encompass the bent portion 311c from the outer circumference side of the through hole 311a. The spacer 341 is, for example, a ring-shaped member having an inner diameter larger than the diameter of the through hole 311a by the plate thickness of the sealing plate 311. The thickness of the spacer 341 is approximately the same as the bent width of the bent portion 311c. Accordingly, the spacer 341 is configured to be sandwiched between the lower-side insulation ring 131 and the sealing plate 311 in the outer circumference side of the O-ring 133.

Further, the sealing plate 311 has an outermost peripheral portion 311b configured to be wound together with the upper end portion of the outer casing 121 when the sealing plate 311 is attached to the outer casing 121. Here, in the step of attaching the sealing plate 311, the sealing plate 311 may be joined by e.g. welding in the same manner as first embodiment.

In such a construction, in the step of assembling the terminal portion 350 of this embodiment, the spacer 341 is attached to the outer circumference of the through hole 311a prior to insertion of the terminal 112 into the through hole 311a. Thereafter, the lower-insulation ring 131 is fit into the terminal 112 and then, they are inserted into the through hole 311a, followed by fitting the O-ring 133, the upper-side insulation ring 137 and a setting spring 139 in this order. Here, since the rigidity of the bent portion 311c is increased by the spacer 341, the O-ring 133 is press fit into the spacing 335 without excessive bent of the bent portion 311c.

Thereafter, the outermost peripheral portion 311b of the sealing plate 311 to which the terminal 112 is attached, is wound together with the upper end portion of the outer casing 121, whereby the outer casing 121 is sealed by the sealing plate 311.

As a result, since the O-ring 133 is press-fit into the spacing 335 between the outer circumference of the cylindrical portion 112a and the bent portion 311c in the same manner as the first embodiment, airtightness between the terminal 112 and the sealing plate 311 is maintained. Further, since the outermost peripheral portion 311b of the sealing plate 311 is wound together with the upper end portion of the outer casing 121, airtightness between these components is sufficiently maintained.

Further, since the lower-side insulation ring 131 and the upper-side insulation ring 137 are interposed between the terminal 112 and the sealing plate 311 in the same manner as the first embodiment, the terminal 112 and the sealing plate 111 are sufficiently insulated from each other.

Further, since the rigidity of the bent portion 311c is increased by the spacer 341, deterioration of airtightness between the terminal 112 and the sealing plate 311 due to jounce of the terminal 112, is prevented.

For the reasons described above, even if the plate thickness of the sealing plate 311 is thin, it is possible to prevent leakage of an electrolytic solution from the inside or interfusion of unnecessary materials from the outside, and it is possible to provide sufficient insulation between the terminal 112 and the outer casing 121.

By these effects, it is possible to appropriately select the terminal portion 150 of the first embodiment or the terminal portion 350 of this embodiment depending on the plate thickness of the portion to which e.g. the terminal 112 is attached. Accordingly, the terminal 112 can be attached to a portion having any plate thickness.

Here, in this embodiment, explanation has been made on the assumption that the bent portion 311c of the sealing plate 311 is formed by bending the sealing plate 311 around the through hole 311a towards the lower side. However, the construction is not limited thereto. Namely, the sealing plate 311 around the through hole 311a may be bent towards the upper side. In this case, the spacer 341 may be disposed in the outer side of the outer casing 121.

Further, in this embodiment, explanation has been made on the assumption that the terminal 112 is a hollow member. However, the terminal 112 may be a solid member in the same manner as the first embodiment. Further, instead of fixing the terminal 112 by the setting spring 139, fixing by screwing or fixing by a shaft-retaining ring may be employed.

EXAMPLE

The most suitable example of the above electric double layer capacitors 100, 200 and 300 will be described. The material of the outer casing 121 is not particularly limited, and it is preferably, for example, a metal material or a resin material. Further, the material of the sealing plate 111 is also not particularly limited, and it is preferably, for example, a metal material or a resin material.

Further, the material of the terminal 112 is the most preferably aluminum, an aluminum alloy or a stainless steel so as to reduce the resistance of the terminal 112 itself. The material of the electric collection member 105 is also the most preferably aluminum, an aluminum alloy or a stainless steel to reduce the resistance of the electric collection member itself and since the same material as the electric collector plate 103 is preferred for e.g. bonding with the electric collector plate 103.

Further, the material of the lower-insulation ring 131 is not particularly limited so long as it is an insulative material, it is preferably polyphenylene sulfide+glass fiber or an ethylenetetrafluoride resin+glass fiber from the viewpoint of e.g. heat resistance properties. The material of the upper-insulation ring 137 is also in the same manner. The setting spring 139 is preferably made of a stainless steel plate but it may be made of another material.

The material of the O-ring 133 is preferably determined by the performances required to the electric double layer capacitors 100, 200 and 300, and it is preferably e.g. a fluoro rubber, a silicone rubber or an ethylene propylene rubber.

Further, with respect to the O-ring 133, it has become clear that its filling rate remarkably influences e.g. leakage of an electrolytic solution. Here, since the cross sectional shape of the O-ring 133 is constant, the filling rate of the O-ring 133 corresponds to the cross sectional area of the O-ring 133 divided by the cross sectional area of the spacing (i.e. the spacing 135 or the spacing 355) to which the O-ring 133 is press fit.

An O-ring is usually used with a filling rate of about 0.7 to 0.9. However, according to the experiment by the inventors, leakage of an electrolytic solution is prevented by making the filling rate of the O-ring 133 at least 0.9 in the electric double layer capacitors 100, 200 and 300 of the present invention. Here, this feature is also applicable to cases of employing a ring-shaped sealing member having a cross sectional shape other than O-shape.

Further, the compression margin of the O-ring 133 is preferably within the range specified JIS B 2406.

INDUSTRIAL APPLICABILITY

The present invention can be applied to an electric double layer capacitor capable of preventing leakage of an electrolytic solution from inside of capacitor and interfusion of unnecessary materials from the outside, and capable of forming insulation between a terminal and an outer casing.

The entire disclosure of Japanese Patent Application No. 2003-360126 filed on Oct. 21, 2003 including specification, claims, drawings and summary is incorporated herein by reference in its entirety.

What is claimed is:

1. An electric double layer capacitor comprising:
    an electrolytic solution;
    an element assembly comprising a positive electrode and a negative electrode which are electrodes each forming an electric double layer at the interface with the electrolytic solution, and a separator interposed between the positive electrode and the negative electrode;
    an outer casing for accommodating the element assembly;
    a sealing plate sealing the outer casing; and a terminal portion attached to a through hole perforating the sealing plate and conducting input and output of an electric energy between the element assembly accommodated in the outer casing and the outside;
    wherein the terminal portion is constituted by a terminal; fixing means; a first insulation member and a second insulation member which are each encompassing the outer face of the terminal; and a sealing member;
    the terminal is inserted into the through hole and electrically connected with one of the electrodes and has a flange portion formed at a portion below the sealing plate, and has a concave portion formed in a portion of the outer face of the terminal above the sealing plate;
    the first insulation member is provided between the flange portion and the sealing plate;
    the second insulation member is provided in the upper side of the sealing plate;
    the sealing member is provided in a spacing defined by the inner face of the through hole, the outer face of the terminal, the first insulation member and the second insulation member; and
    and the fixing means has one end engaged in the concave portion and another end pushing the second insulation member against the sealing plate.

2. The electric double layer capacitor according to claim 1, wherein the sealing plate has a bent portion formed by bending the end portion around the through hole, and the sealing member is provided in a spacing defined by the bent portion, the outer face of the terminal, the first insulation member and the second insulation member.

3. The electric double layer capacitor according to claim 2, wherein the filling rate of the sealing member in the spacing is at least 0.9.

4. The electric double layer capacitor according to claim 2, wherein the fixing means is a setting spring, a shaft-retaining ring or a nut.

5. The electric double layer capacitor according to claim 2, wherein the outer diameter of the flange portion is formed to be larger than the outer diameter of the through hole.

6. The electric double layer capacitor according to claim 1, wherein the filling rate of the sealing member in the spacing is at least 0.9.

7. The electric double layer capacitor according to claim 1, wherein the fixing means is a setting spring, a shaft-retaining ring or a nut.

8. The electric double layer capacitor according to claim 1, wherein the positive electrode, the negative electrode and the separator are wound together or laminated in a plane shape.

9. The electric double layer capacitor according to claim 1, wherein the terminal is electrically connected with one of the electrodes via a lead portion.

10. The electric double layer capacitor according to claim 9, wherein the lead portion is connected with an electric collector plate and the electric collector plate is connected with the terminal.

11. The electric double layer capacitor according to claim 1, wherein the outer diameter of the flange portion is formed to be larger than the outer diameter of the through hole.

12. The electric double layer capacitor according to claim 11, wherein the lead portion is connected with an electric collector plate and the electric collector plate is connected with the terminal.

13. The electric double layer capacitor according to claim 1, wherein the terminal is formed to be a hollow shape and an electric collection member is disposed in the hollow space.

14. The electric double layer capacitor according to claim 1, wherein the terminal is solid.

* * * * *